US008065615B2

(12) United States Patent
Murray et al.

(10) Patent No.: US 8,065,615 B2
(45) Date of Patent: Nov. 22, 2011

(54) METHOD OF RETRIEVING INFORMATION ASSOCIATED WITH AN OBJECT PRESENT IN A MEDIA STREAM

(76) Inventors: James H. Murray, Bloomfield Hills, MI (US); Neal Fairbanks, Livonia, MI (US)

( * ) Notice: Subject to any disclaimer, the term of this patent is extended or adjusted under 35 U.S.C. 154(b) by 1629 days.

(21) Appl. No.: 10/605,684

(22) Filed: Oct. 17, 2003

(65) Prior Publication Data
US 2004/0104926 A1    Jun. 3, 2004

Related U.S. Application Data

(63) Continuation-in-part of application No. 09/630,002, filed on Jul. 31, 2000, now Pat. No. 6,636,237.

(51) Int. Cl.
*G06F 3/00* (2006.01)
*G06F 3/01* (2006.01)
(52) U.S. Cl. ......... 715/723; 715/716; 715/719; 715/731
(58) Field of Classification Search ............... 715/716, 715/719, 723, 727, 731
See application file for complete search history.

(56) References Cited

U.S. PATENT DOCUMENTS

| 5,065,345 A | * | 11/1991 | Knowles et al. ........... 715/500.1 |
| 5,109,482 A | * | 4/1992 | Bohrman ..................... 715/723 |
| 5,204,947 A | * | 4/1993 | Bernstein et al. ............. 715/854 |
| 5,319,455 A | * | 6/1994 | Hoarty et al. ................... 725/34 |
| 5,422,674 A | * | 6/1995 | Hooper et al. ........... 375/240.15 |
| 5,461,415 A | * | 10/1995 | Wolf et al. ....................... 725/88 |
| 5,495,576 A | | 2/1996 | Ritchey ......................... 395/125 |
| 5,524,195 A | * | 6/1996 | Clanton et al. .................. 725/61 |
| 5,555,354 A | | 9/1996 | Strasnick et al. ............. 395/127 |
| 5,684,715 A | * | 11/1997 | Palmer .......................... 348/473 |
| 5,689,799 A | | 11/1997 | Dougherty et al. |
| 5,704,050 A | | 12/1997 | Redpath ........................ 395/339 |
| 5,708,764 A | | 1/1998 | Borrel et al. .................. 395/119 |
| 5,708,845 A | | 1/1998 | Wistendahl et al. .......... 395/806 |
| 5,740,549 A | | 4/1998 | Reilly et al. .................... 705/14 |
| 5,841,440 A | | 11/1998 | Guha ............................. 345/419 |
| 5,848,352 A | | 12/1998 | Dougherty et al. |

(Continued)

OTHER PUBLICATIONS

Wink Communications, Wink Program Overview, Nov. 30, 2001.*

(Continued)

*Primary Examiner* — Nicholas Augustine
(74) *Attorney, Agent, or Firm* — Howard & Howard Attorneys PLLC

(57) ABSTRACT

The subject invention provides a method of retrieving information (10) associated with an object (12) present in a media stream (14). The method includes the steps of accessing the information (10) during playback of the media stream (14) on any device and defining user-selectable regions (18) in a layer (20) separate from the media stream (14). The layer (20) is preferably a clear applet for receiving and storing the user-selectable regions (18). The defining of the user-selectable region (18) is performed without editing individual frames of the media stream (14). A link (34) is associated between the user-selectable region (18) and the information (10) associated with the object (12) to identify the location where information (10) associated with the object (12) is stored. In operation, the layer (20) is disposed adjacent the media stream (14) without interfering with playback of the media stream (14) in the player. During playback of the media stream (14), the user-selectable regions (18) are capable of being selected. Once the user-selectable region (18) is selected, the information (10) associated with the object (12) is then displayed.

39 Claims, 9 Drawing Sheets

U.S. PATENT DOCUMENTS

| | | | | |
|---|---|---|---|---|
| 5,850,352 | A | | 12/1998 | Moezzi et al. ............ 364/514 A |
| 5,893,091 | A | | 4/1999 | Hunt et al. ........................ 707/3 |
| 5,926,179 | A | | 7/1999 | Matsuda et al. ............. 345/355 |
| 5,950,172 | A | | 9/1999 | Klingman ...................... 705/26 |
| 5,969,715 | A | * | 10/1999 | Dougherty et al. .......... 725/110 |
| 5,982,372 | A | | 11/1999 | Brush, II et al. ............. 345/418 |
| 6,002,394 | A | | 12/1999 | Schein et al. ................. 345/327 |
| 6,009,410 | A | | 12/1999 | LeMole et al. ................ 705/14 |
| 6,011,562 | A | | 1/2000 | Gagne et al. ................. 345/473 |
| 6,020,885 | A | * | 2/2000 | Honda .......................... 715/757 |
| 6,025,837 | A | * | 2/2000 | Matthews et al. ............ 715/721 |
| 6,031,541 | A | | 2/2000 | Lipscomb et al. ............ 345/425 |
| 6,044,403 | A | | 3/2000 | Gerszberg et al. ........... 709/225 |
| 6,144,375 | A | | 11/2000 | Jain et al. ..................... 345/302 |
| 6,144,390 | A | | 11/2000 | Ensor ........................... 345/473 |
| 6,144,975 | A | | 11/2000 | Harris, Jr. et al. ............ 707/901 |
| 6,154,771 | A | | 11/2000 | Kangan et al. ............... 709/217 |
| 6,161,126 | A | | 12/2000 | Wies et al. ................... 709/203 |
| 6,166,744 | A | | 12/2000 | Jaszlics et al. ............... 345/435 |
| 6,219,045 | B1 | | 4/2001 | Leahy et al. ................. 345/331 |
| 6,233,734 | B1 | * | 5/2001 | Macrae et al. ................. 725/50 |
| 6,240,555 | B1 | * | 5/2001 | Shoff et al. .................. 725/110 |
| 6,295,055 | B1 | * | 9/2001 | Miller et al. ................. 715/700 |
| 6,326,963 | B1 | | 12/2001 | Meehan ........................ 345/419 |
| 6,388,665 | B1 | | 5/2002 | Linnett et al. ................ 345/473 |
| 6,404,978 | B1 | | 6/2002 | Abe ............................... 386/55 |
| 6,405,175 | B1 | | 6/2002 | Ng ................................. 705/14 |
| 6,417,853 | B1 | | 7/2002 | Squires et al. ................ 345/473 |
| 6,496,981 | B1 | * | 12/2002 | Wistendahl et al. .......... 725/112 |
| 6,530,082 | B1 | | 3/2003 | Del Sesto et al. |
| 6,530,084 | B1 | | 3/2003 | Del Sesto et al. |
| 6,615,408 | B1 | * | 9/2003 | Kaiser et al. ................. 725/112 |
| 6,631,523 | B1 | * | 10/2003 | Matthews et al. .............. 725/53 |
| 6,642,940 | B1 | * | 11/2003 | Dakss et al. ................. 715/723 |
| 6,774,908 | B2 | | 8/2004 | Bates et al. |
| 7,020,351 | B1 | * | 3/2006 | Kumar et al. ................ 382/305 |
| 7,028,324 | B2 | * | 4/2006 | Shimizu et al. ................ 725/32 |
| 7,039,857 | B2 | * | 5/2006 | Beck et al. ................ 715/500.1 |
| 7,103,906 | B1 | * | 9/2006 | Katz et al. ...................... 725/87 |
| 7,117,517 | B1 | * | 10/2006 | Milazzo et al. ................. 725/60 |
| 7,120,924 | B1 | * | 10/2006 | Katcher et al. ................. 725/60 |
| 7,143,428 | B1 | * | 11/2006 | Bruck et al. .................... 725/37 |
| 7,177,844 | B2 | * | 2/2007 | Fish et al. ...................... 705/57 |
| 7,197,708 | B1 | * | 3/2007 | Frendo et al. ................ 715/718 |
| 7,222,155 | B1 | * | 5/2007 | Gebhardt et al. ............ 709/204 |
| 7,245,291 | B2 | * | 7/2007 | Sharif et al. .................. 345/172 |
| 7,249,367 | B2 | * | 7/2007 | Bove et al. ..................... 725/60 |
| 2001/0001160 | A1 | * | 5/2001 | Shoff et al. ................... 725/51 |
| 2001/0003177 | A1 | | 6/2001 | Schena et al. .................. 705/27 |
| 2002/0056136 | A1 | * | 5/2002 | Wistendahl et al. .......... 725/135 |
| 2003/0005445 | A1 | | 1/2003 | Schein et al. ................... 725/51 |
| 2003/0040962 | A1 | * | 2/2003 | Lewis ............................. 705/14 |
| 2004/0104926 | A1 | * | 6/2004 | Murray et al. ................ 345/719 |
| 2004/0117831 | A1 | * | 6/2004 | Ellis et al. ...................... 725/53 |
| 2004/0139465 | A1 | * | 7/2004 | Matthews et al. .............. 725/51 |
| 2005/0198677 | A1 | * | 9/2005 | Lewis ............................. 725/87 |

OTHER PUBLICATIONS

Tracy Swedlow, Interactive TV Today, Jan. 22, 2001, http://www.itvt.com/etvwhitepaper.html.*

Liang-Jie Zhang et al., A Per-object-granularity Tracking Mechanism for Interactive TV Viewership Estimation and Program Rating, IEEE 2002114351/02, 2002.*

Itvt (Interactive TV today), Wink Program Overview, copyright 1998-2003, http://www.itvt.com/screenShotGallery/Intellocity_&_Wink_Communications/page1.html.*

IBM China Research Lab, IBM HotVideo, 1996; http://domino.research.ibm.com/comm/research_people.nsf/pages/zhanglj8.projects.html.*

V. Michael Bove, Jr. et al. Adding Hyperlinks to Digital television, Proc. 140$^{th}$ SMPTE Technical Conference, 1998.*

V.M. Bove, Jr. et al, Hyperlinked television research at the MIT Media Laboratory, IBM, 2000, p. 472 (right column).*

Dr. Liang-Jie Zhang, SOA Innovations, http://www-03.ibm.com/developerworks/blogs/page/zhanglj , Hotmedia TV Jun. 2000.*

Rudy J. Klancnik, "Tuned In", American Way, Aug. 1, 2003, pp. 48-51.

Johnathan Dakss, "HyperActive: An Automated Tool for Creating Hyperlinked Video", Aug. 6, 1999, pp. 1-100, Massachusetts Institute of Technology.

* cited by examiner

METHOD OF RETRIEVING INFORMATION ASSOCIATED WITH AN OBJECT PRESENT IN A MEDIA STREAM

CROSS REFERENCE TO RELATED APPLICATIONS

This application is a continuation-in-part of U.S. patent application Ser. No. 09/630,002, filed Jul. 31, 2000.

BACKGROUND OF INVENTION

1) Field of the Invention

The subject invention relates to a method of retrieving information associated with an object present in a media stream without editing the media stream.

2) Description of Related Art

Society is increasingly becoming tired of traditional advertising and corporations are striving to find new methods of conveying information about their products. One example of the new methods of advertising is disclosed in the article entitled Tuned In, which appeared in the August 2003 issue of AMERICAN Way. The article describes a viewer of a NASCAR race being able to interact with his favorite drivers competing in the race from his own living room or being able to allow the user to order items directly through their television and have it delivered to their home. One problem with the general ideas described in the article is the cost required for providing such services and time and effort required to establish these capabilities. To date, the industry has been unable to provide a method of providing this functionality that is cost effective and that does not require extreme time and effort.

There are various methods of interacting with a media stream to obtain information, such as providing limited services. An example of such a method is disclosed in U.S. Pat. No. 6,002,394 and U.S. patent application No. 20030005445, both to Schein et al. These references disclose an invention practiced under WebTV®, hereinafter referred to as interactive TV. The interactive TV provides a television schedule and information guide, which allows interaction between a television viewer and information associated with a television program. Two-way communication is established with an on-line internet provider. The on-line internet provider is used to provide information from broadcast stations and advertisers. The on-line internet provider supplies information concerning the television program, actors, products related to the program, etc. in a product window. The link to the information is established between the information and the program itself. The information is only unique to the program the viewer chooses to select. However, this method only provides superficial information to the viewer and the information is not being directly associated with objects in the media streams. Therefore, they have avoided expending great resources to establish their interactive television. This type of method is also commonly provided by digital cable and satellite providers.

Other methods allow for creating hot spots for an object within a media stream and retrieving information associated with the object upon selecting the hot spot. However, each of the methods known to those skilled in the art require editing of individual frames of the media stream, which requires a significant outlay of the time and effort to establish such methods. Therefore, this technology has been slow to develop within the industry and very few would consider undertaking such a method. One method shown U.S. Pat. Nos. 5,708,845 and 6,496,981, both to Wistendahl et al., discloses creating hot spots for objects present in a media stream and associating information for the objects to the hot spots. This allows a user to select the hot spot to access the associated information. Each of the '845 and the '981 patents requires editing of individual frames of the media stream to create the hot spots for the objects. It is well known to those skilled in the art to define hot spots using positional data having two or three coordinates.

However, one issue presented in creating these hot spots is interleaving it with the media stream. Faced with this issued, these references disclose transmitting the hot spots in video blanking intervals (VBI) associated with the media stream. In other words, if the video is being transmitted at 30 frames per second, only about 22 frames actually contain the media stream. This leaves 8 frames that are considered blank and one or two of these individual frames receives the hot spot data. Since the frames are passing at such a rate, the user or viewer upon seeing the hot spot and wishing to select it, will select it for a long enough period of time such that a blank frame having the hot spot data will pass during this period. The '845 patent and the '981 patent additionally disclose editing only selected frames of the media stream, instead of editing each of the individual frames. However, even if two frames per second were edited, for a half-hour media stream, 3,600 frames would have to be edited. This would take considerable time and effort even for a most skilled editor.

Another method disclosed in U.S. Pat. No. 6,154,771 to Rangan et al. incorporates hyperlinks into a media stream. The hyperlinks are created by a service provider and are edited into the individual frames of the media stream. The media stream is parsed and displayed as an array of static images for the user to see a past history of the media stream. Editing the individual frames, as mentioned above, requires significant time, skill, and effort and is a major burden to be overcome in providing this functionality to users and viewers in a cost effective manner.

These related art methods are characterized by one or more inadequacies. Accordingly, it would be advantageous to provide a method that overcomes these inadequacies by retrieving information for an object without editing the media stream. More specifically, it would be advantageous to provide these user-selectable regions, hot spots, or hyperlinks, without editing individual frames of the media stream such that it is economical and efficient.

SUMMARY OF INVENTION

The subject invention provides a method of retrieving information Associated with an object present in a media stream. The method includes the steps of defining a user-selectable region corresponding to the object in a layer separate from the media stream. The user-selectable region is defined without accessing individual frames of the media stream. A link is defined to the information associated with the object within the layer and is linked to the user-selectable region in the layer. The layer is disposed adjacent the media stream without interfering with playback of the media stream and the user-selectable region is positioned in the layer over the object during playback of the media stream. While the media stream is playing, a user may select the user-selectable region from within the layer to access the information associated with the object in response to selecting the user-selectable region.

The subject invention overcomes the inadequacies that characterize the related art methods. One aspect of the subject invention allows the user-selectable regions to be defined for any object in the media stream quickly and seamlessly without having to edit the individual frames of the media stream as required in the related art methods. The subject invention minimizes cost associated with creating the user-selectable regions since the individual frames are not being edited which makes the technology economically feasible. Further, the subject invention allows for such quick defining and re-defining of the user-selectable regions that it may even be utilized for live broadcasts having a short time delay. Another aspect of the subject invention stores, tracks, and transmits selections made by the user to allow for research gathering as it relates to the marketing and advertising for the object and for convenience of the user.

BRIEF DESCRIPTION OF DRAWINGS

Other advantages of the present invention will be readily appreciated, as the same becomes better understood by reference to the following detailed description when considered in connection with the accompanying drawings wherein.

DETAILED DESCRIPTION

Figure 1:
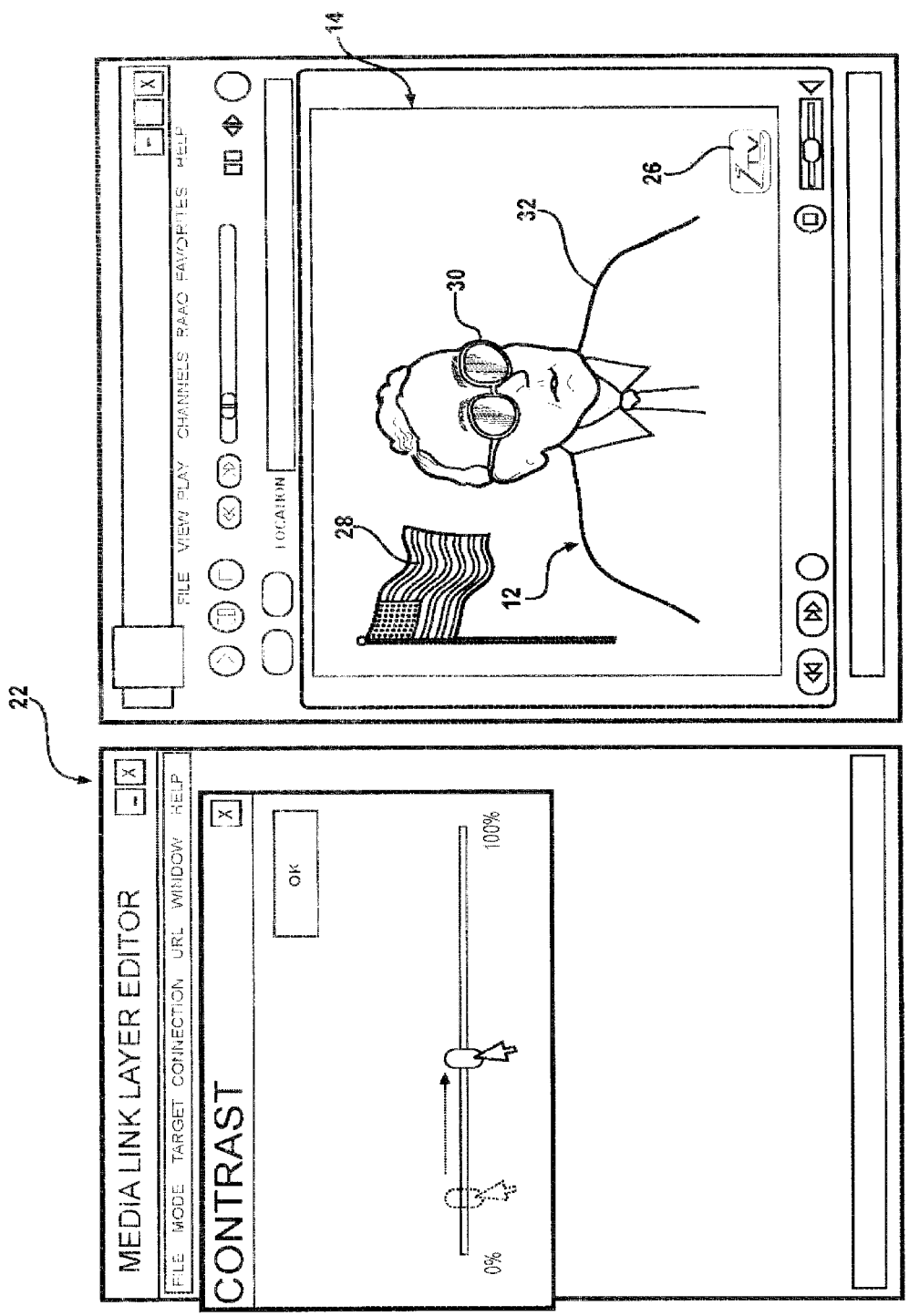
FIG. 1 is an illustration of an editor having a media stream to be played and a layer for defining user-selectable regions therein.

A method of retrieving information 10 associated with an object 12 present in a media stream 14 is disclosed. The method may be performed on various types of devices 16 such as, but not limited to, digital cable boxes, satellite receivers, TiVO recorders, personal video recorders, video cassette players/recorders, digital video disc players/recorders, televisions, computers, and the like. Newer models of televisions may include internal hard drives and circuitry that allows for convenient practicing of the subject invention. The method includes the step of accessing the information 10 during playback of the media stream 14 on any of the devices 16 and also includes the step of defining user-selectable regions 18 in a layer 20 separate from the media stream 14. The layer 20 is preferably a clear applet that is displayed adjacent the media stream 14 for receiving and storing the user-selectable regions 18. The defining of the user-selectable region 18 is performed with an editor 22, which is typically separate from the devices 16 for playing the media stream 14. The editor 22 may include a software program capable of playing the media stream 14 with the layer 20 disposed adjacent the media stream 14. The editor 22 is capable of defining user-selectable regions 18 within the layer 20 without editing the media stream 14, as described below. Referring to FIGS. 1-4, a typical screen shot of the editor 22 is shown. The user-selectable regions 18, commonly referred to as hot-spots or hyperlinks are capable of being selected by a user or a viewer and performing a function, such as obtaining or displaying associated information 10, once selected.

The user-selectable regions 18 may be defined by using computers or similar equipment running the editor 22. Referring to FIG. 1, the layer 20 is disposed over the media stream 14 in the editor 22 while defining the user-selectable regions 18 such that the layer 20 is co-extensive with the media stream 14. The editor 22 is shown modifying the contrast between the layer 20 and the media stream 14 to assist in defining the user-selectable regions 18. If the media stream 14 is played at full screen resolution, the layer 20 is sized to fit the media stream 14. In other words, the layer 20 is adaptable to various sized windows or screen sizes. However, the layer 20 may be re-sized in relation to the size of the media stream 14 such that the user-selectable regions 18 remain associated with the object 12. The media stream 14 includes the object 12 therein, which will assist in defining the user-selectable regions 18. The media stream 14 includes, but is not limited to, recorded or live television programs, movies, sporting events, game shows, advertisements, video games and the like. As illustrated in the Figures, but in no way limiting, the media stream 14 is illustrated as a news broadcast. The subject invention may be utilized on live shows that are delayed for a short period of time to allow for the defining of the user-selectable regions 18. Typically, these media streams 14 are captured on film at many frames per second, such as between 10 frames per second and 30 frames per second. Therefore, in a half-hour media stream 14, there may be as many as 108,000 frames. However, it is to be appreciated that the media stream 14 may have more or less frames per second depending upon the particular medium. Further, these media streams 14 may include digitally created and re-mastered media streams 14 that may be played on any of the above devices 16.

The objects 12 may be placed in the media stream 14 for brand awareness, which is typically referred to as product placement or integration. To date and with traditional product placement, the viewer is only able to view the products without obtaining any information 10 associated with the object 12. Examples of product placement include placing the product in television programs so those viewers of the television program will see the products and advertising at venues hosting sporting events such that their advertisements are displayed during the broadcast of the sporting event. However, the user watching the media stream 14 is unable to access information 10 associated with the object 12 present in the media stream 14. For example, if a character in a movie 42 is wearing a particular outfit and the viewer is interested in the outfit, the viewer is unable to obtain information 10 associated with the particular outfit by interacting with the device.

Figure 7:
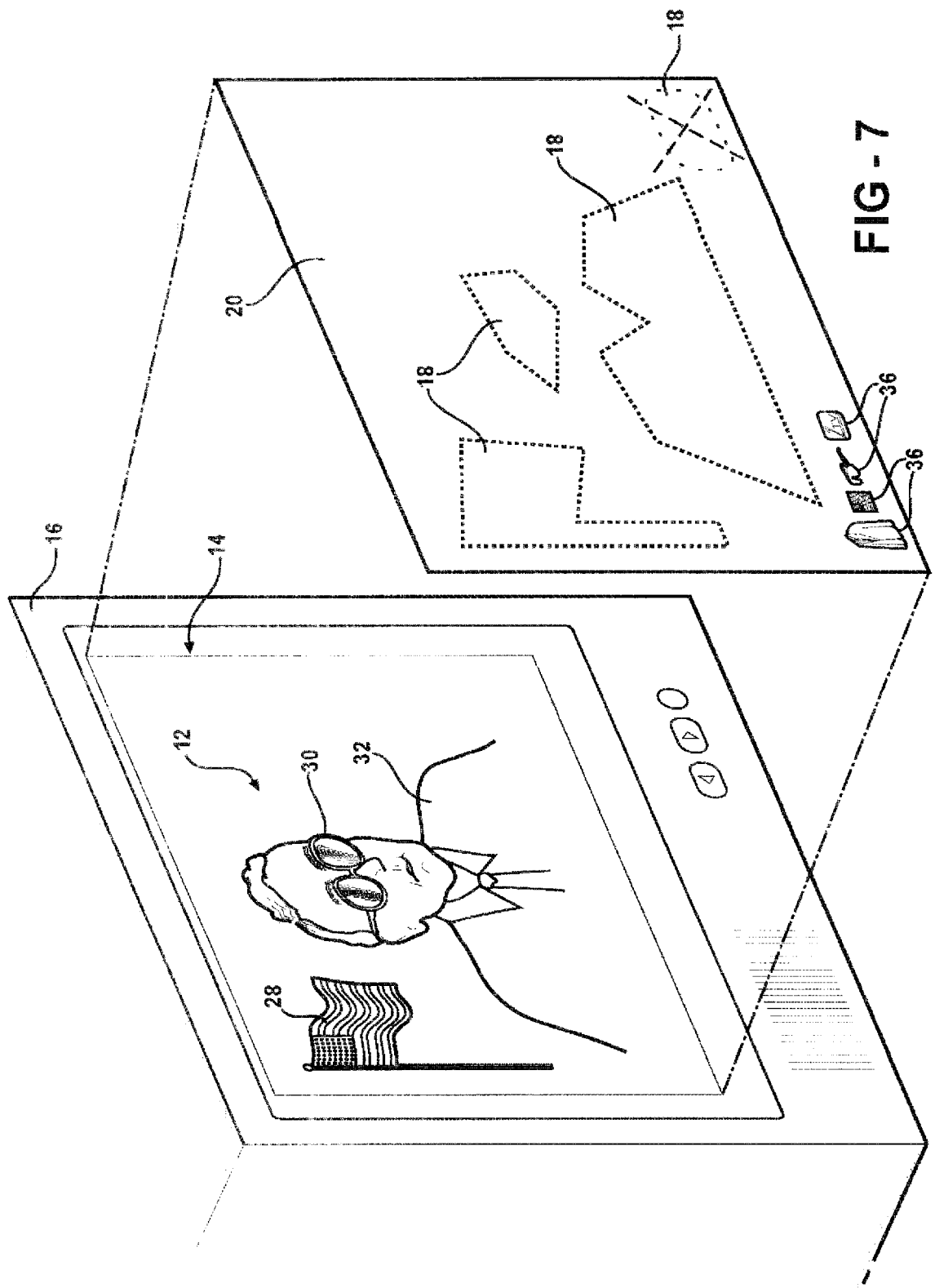
FIG. 7 is an illustration of the player having a deactivated user-selectable region in response to the object disappearing from the media stream.
Figure 8:
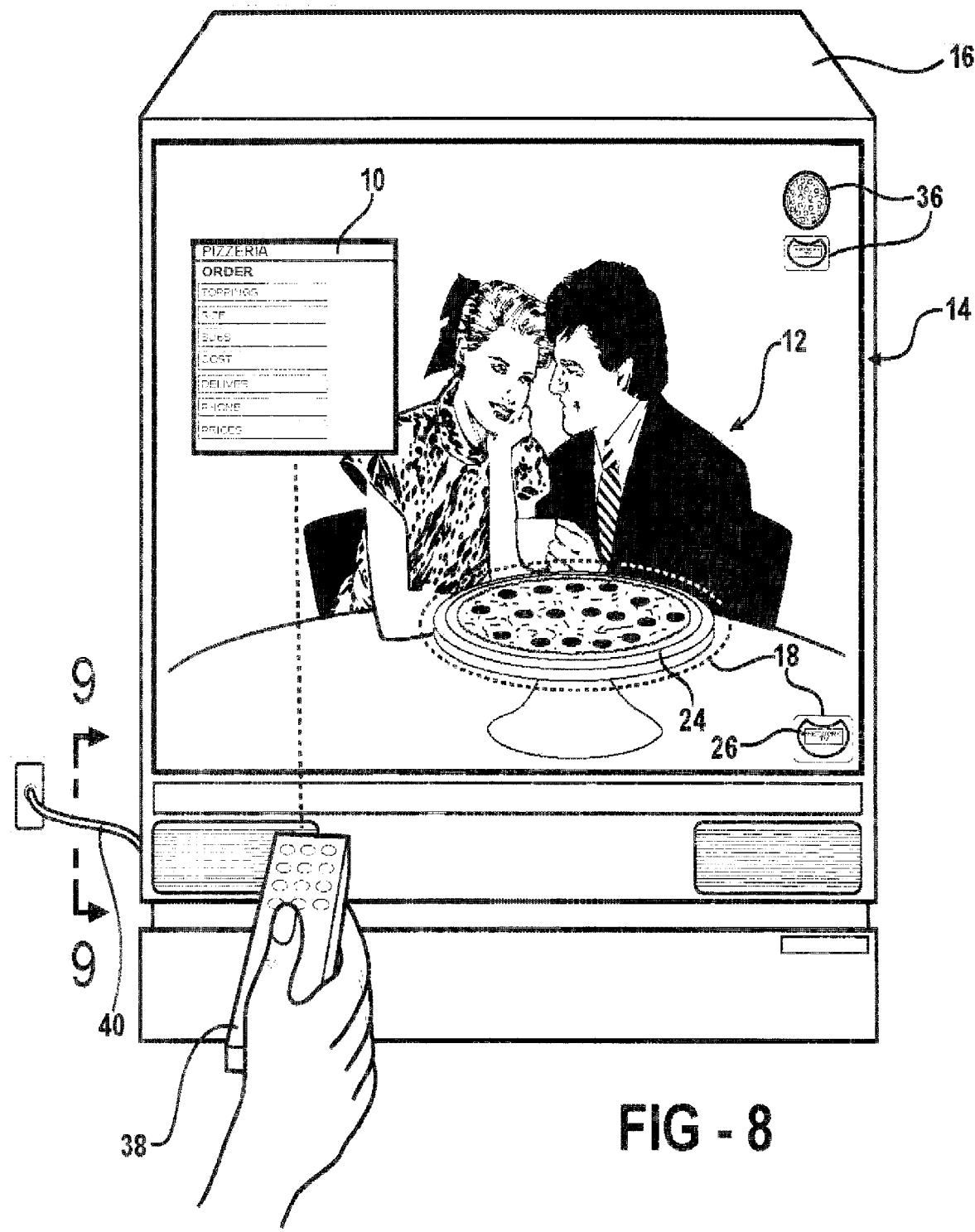
FIG. 8 is an illustration of the player having the layer with user-selectable regions being selected to order an item.

Those skilled in the art shall recognize that the type of object 12 is not limited, and may be any item in the media stream 14. Examples of suitable objects 12 include, but are not limited to, clothes, food items, furniture, corporate logos, vehicles, locations, buildings, and the like. Each one of these objects 12 may have information 10 associated with the object 12. In other words, if the food item is a pizza 24, the associated information 10 may include pizzeria information 11 that is local to the viewer, such as telephone numbers, menus, location, etc., as illustrated in FIG. 8. If the object 12 is a location, then the associated information 10 may include population, average weather conditions for the time of year, etc. Referring back to FIGS. 1-7, the objects 12 are a network logo 26, a flag 28, a pair of glasses 30, and a suit 32. The media stream 14 is played in a player and is displayed on a screen to the viewer. The player may be any of the devices 16 listed above or it may be another piece of software stored on the device, such as, but not limited to, Real Player or Media Player on the computer. As the media stream 14 is played at the desired frames per second, the object 12 may move across the picture from one frame to another.

Figure 2:
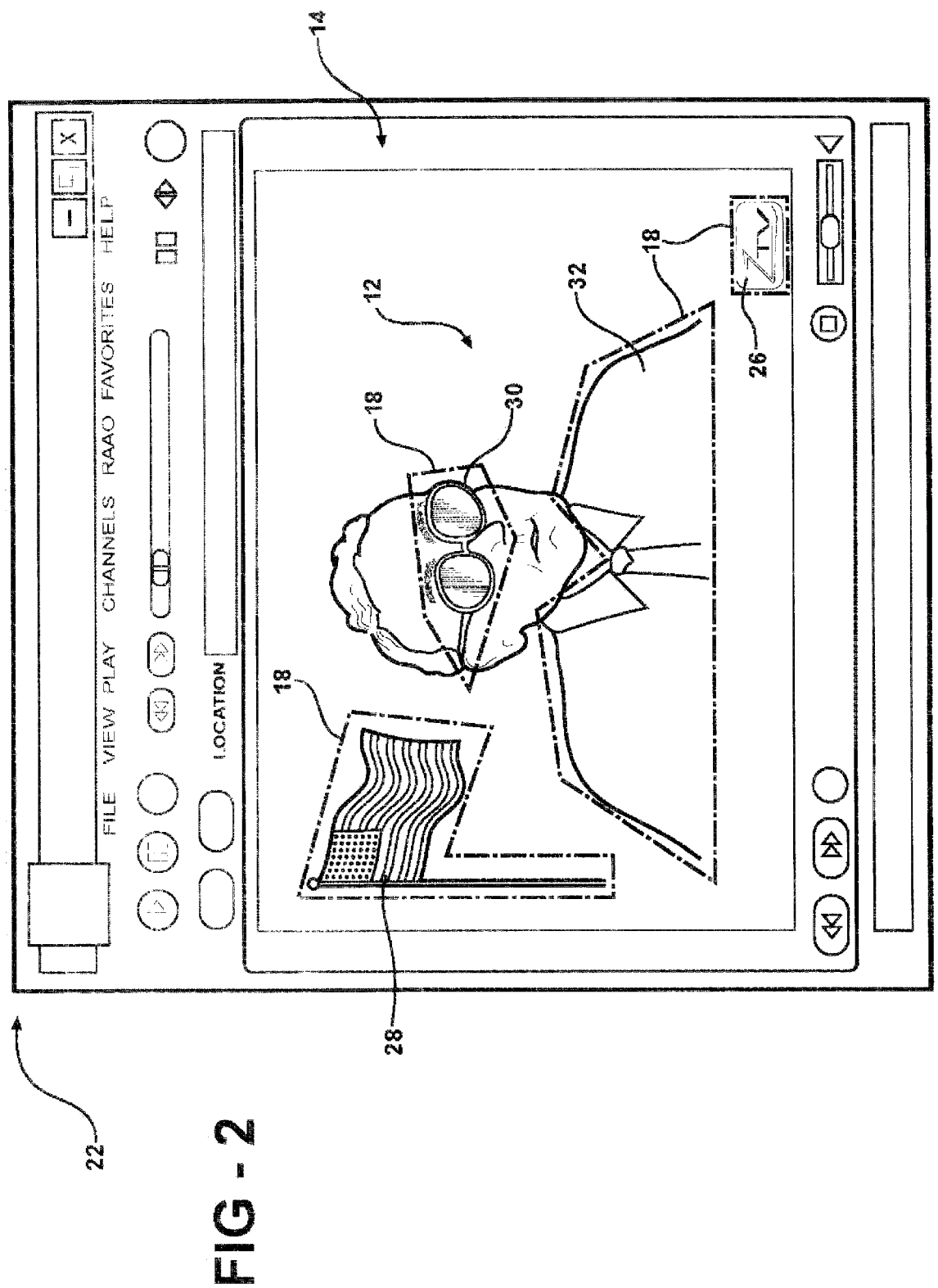
FIG. 2 is an illustration of the editor having the user-selectable regions defined in the layer corresponding with objects present in the media stream.
Figure 3:
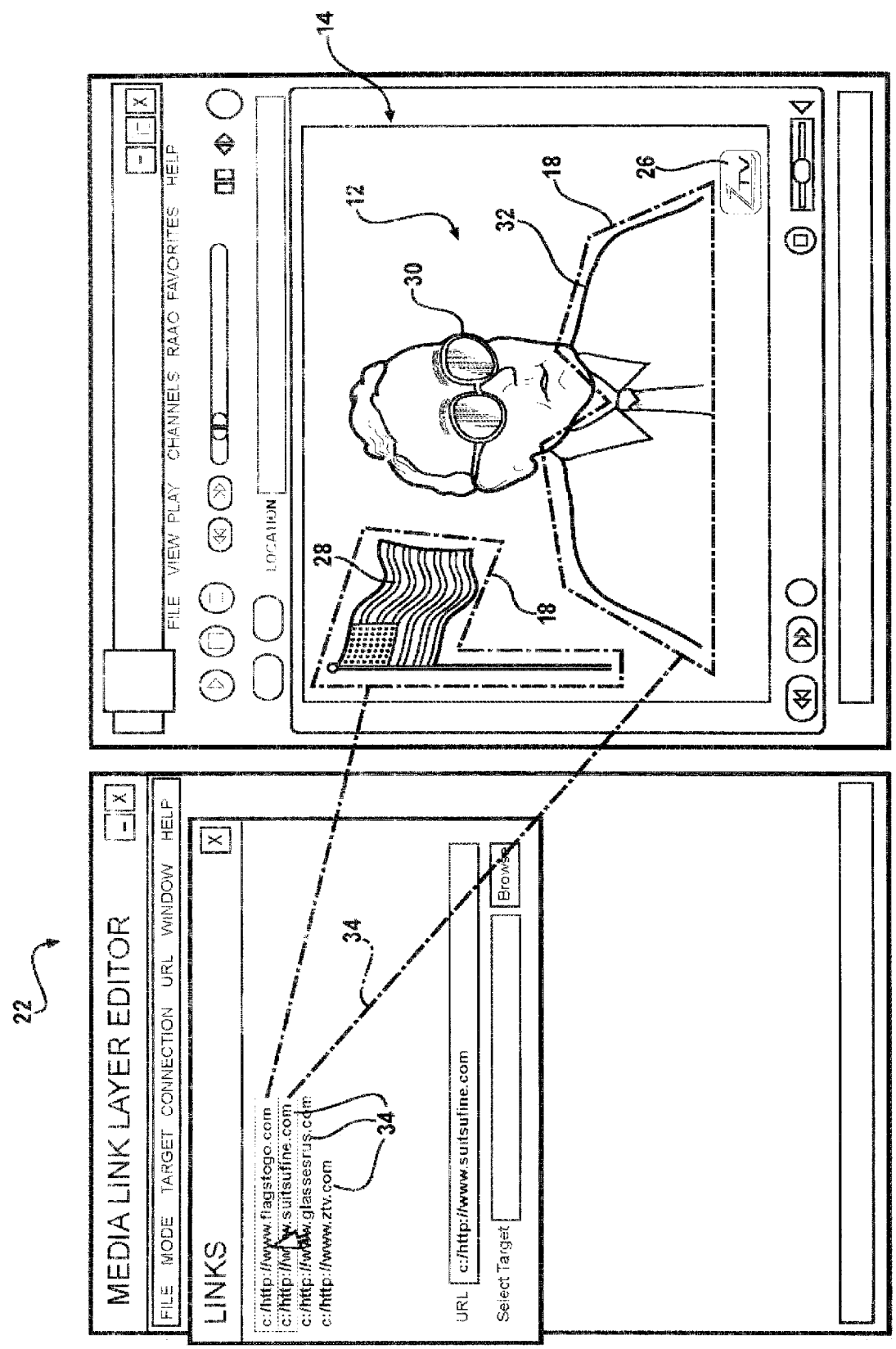
FIG. 3 is an illustration of the editor defining links associated with each of the user-selectable regions linked to information associated with the objects.

The user-selectable region 18 is defined within the layer 20, which is separate from the media stream 14 and corresponds to the object 12 in the media stream 14. The user-selectable region 18 is defined without accessing individual frames of the media stream 14. Referring to FIG. 2, the user-selectable regions 18 are defined during real time playback of the media stream 14 in the editor 22. In this method, a first point in the media stream 14 is designated as a starting point and a second point is designated as the ending point. The starting and the ending point may correspond to the beginning and ending of the media stream 14 or the media stream 14 may be divided into shorter segments depending upon the length of the media stream 14 or the number of user-selectable regions 18 therein. However, it is to be appreciated that it may be broken into smaller segments if storage capacity or bandwidth of the devices 16 or the players are at issue.

One possible way to define the user-selectable region 18 is by using positional information based upon a position and size of the object 12 present in the media stream 14 at the starting point. The media stream 14 is loaded into the editor 22 and stopped at the starting point. For any desired object 12 in the media stream 14, the user-selectable region 18 is defined by outlining the object 12 within the layer 20. In FIG. 2, the logo 26, the flag 28, the glasses 30, and the suit 32 are shown being outlined to define the user-selectable regions 18. The user-selectable region 18 is essentially a closed spline having multiple vertices that define the user-selectable region 18. One way to define the user-selectable regions 18 is to draw with an input tool an outline about the object 12 creating the closed spline. The vertices of the outline are then transformed into positional information/data, such as X and Y coordinates, for the object 12 at the starting point. The user-selectable region 18 may be defined as any size and shape and is only limited by the object 12 located in the media stream 14.

Figure 4:
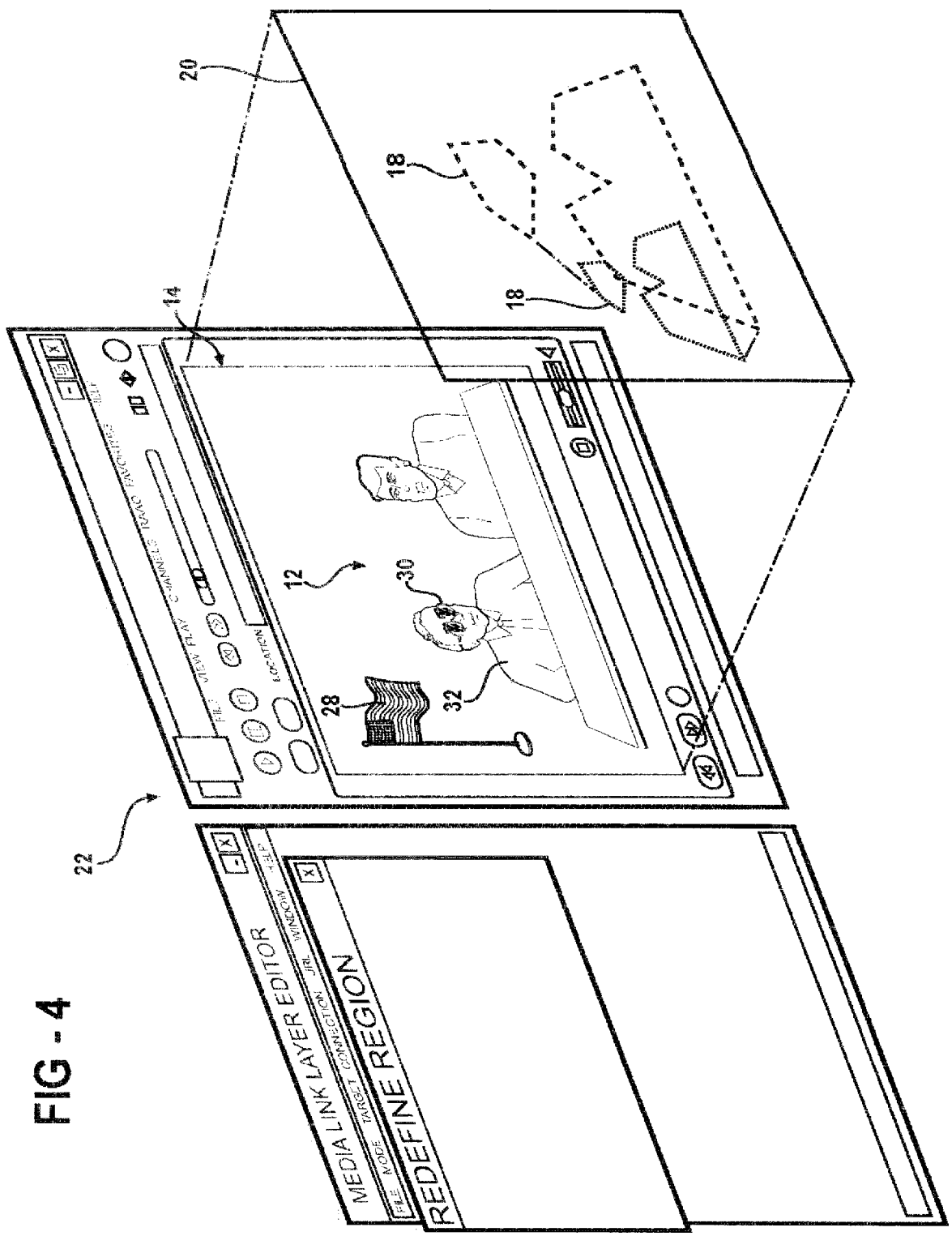
FIG. 4 is an illustration of the editor re-defining the user-selectable regions in response to the objects changing in size and location as the media stream is advanced.

The media stream 14 is then advanced forward, i.e. played or fast-forwarded. Referring to FIG. 4, the media stream 14 has been advanced to include another person in the media stream 14. The closed spline may be re-defined as the object 12 changes location and size through out the media stream 14 and the positional information is continuously updated creating mapping data for the object 12. Re-defining the user-selectable region 18 may be accomplished by clicking and dragging the closed spline to fit the size and location of the object 12. In FIG. 4, the user-selectable regions 18 have been reduced to correspond with the size of the objects 12. As the user-selectable region 18 is re-defined, the mapping data is continuously updated.

The positional data generally refers to the outline at the starting and ending points, while the mapping data refers to the movement of the user-selectable region 18 through out and for the length of the media stream 14. Those skilled in the art would understand that positional data and mapping data generally relate to the same information at different times. Once the ending point of the media stream 14 is reached, the object 12 has been tracked and the positional data for the user-selectable region 18 has been defined for the length of the media stream 14. The mapping data may then be stored and the positional data is associated with the staring and ending point of the media stream 14. If there are multiple objects 12 in the media stream 14, then a plurality of user-selectable regions 18 may be disposed in the layer 20 corresponding to each of the plurality of objects 12 and each of the plurality of user-selectable regions 18 would have corresponding positional data.

Alternatively, another method to define the user-selectable region 18 may be based upon a time period that the object 12 is in one location during playback and then synchronizing the user-selectable region 18 within the layer 20 as the object 12 moves in time. The user-selectable region 18 is defined as described above for the starting point having the positional data. As the media stream 14 is advanced, the time period that the object 12 remains in that position in the media stream 14 is recorded. The time period and the user-selectable region 18 are then synchronized such that the user-selectable region 18 is displayed at that positional data within the layer 20 for the time period. The time period essentially replaces the mapping data in the method described above. This allows the user-selectable region 18 to be selected to access the object information 10. It is to be appreciated that those skilled in the art would recognize additional ways to define the user-selectable regions 18 other than as described based on time and position.

Figure 5:
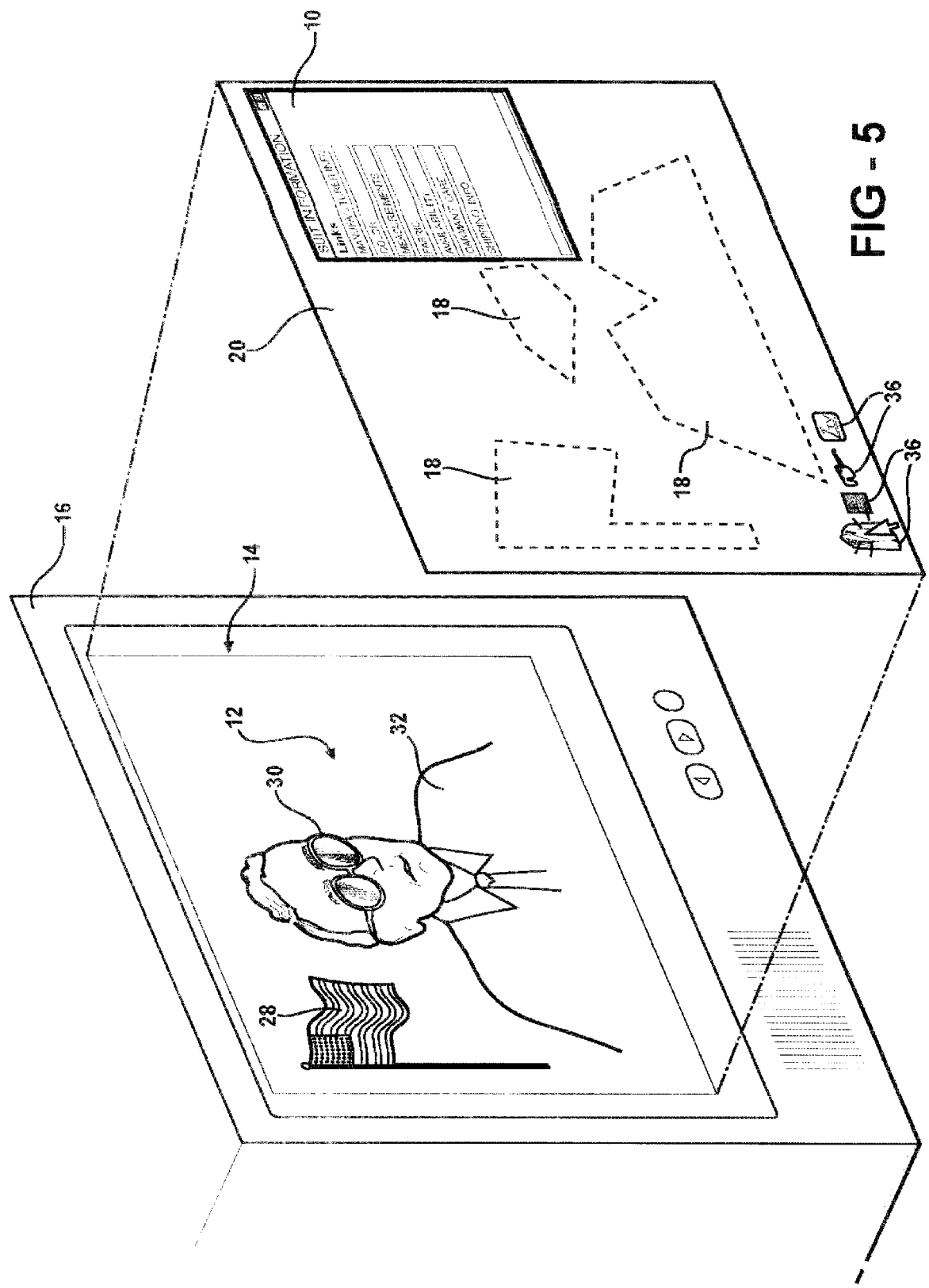
FIG. 5 is an illustration of a player playing the media stream having the objects therein and the layer having the user-selectable regions associated with the objects disposed adjacent the media stream and having icons representing the user-selectable regions with one icon being selected to access the associated information.
Figure 6:
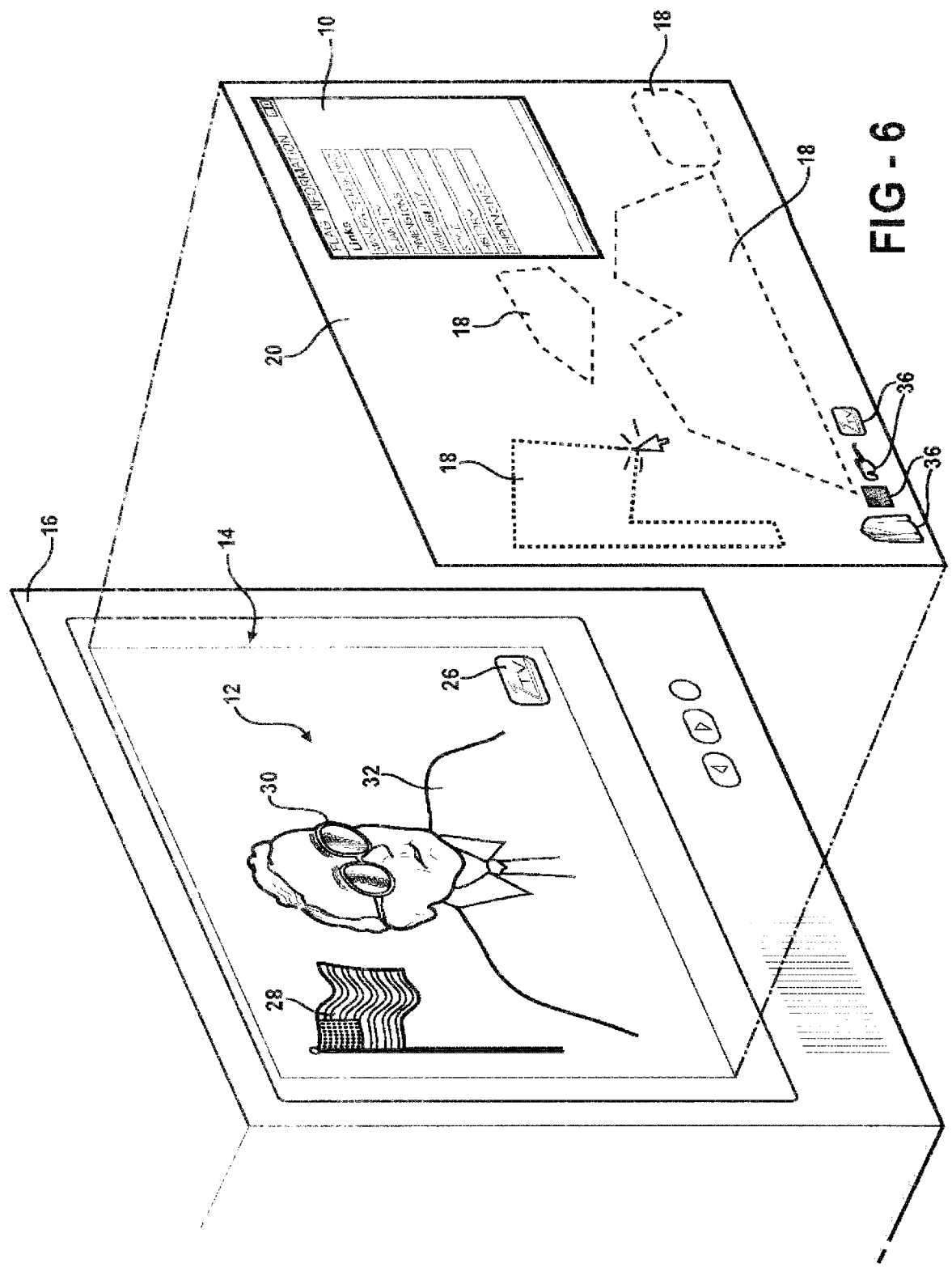
FIG. 6 is an illustration of the player and the layer with one of the user-selectable regions being selected and the associated information being displayed.

As described above and shown in FIG. 4, the user-selectable region 18 is capable of being re-defined. It is to be appreciated that re-defining includes enlarging or reducing the user-selectable region 18 for the object 12 within the layer 20 in response to the size of the object 12 becoming larger or smaller within the media stream 14. The user-selectable region 18 may also be removed altogether in response to the object 12 disappearing from the media stream 14. In FIG. 5, the network logo 26 initially had a user-selectable region 18 defined, but since the logo 26 has disappeared from the media stream 14, so has the user-selectable region 18 disappeared from the layer 20. Alternatively, if the object 12 disappears, the user-selectable region 18 may remain in the layer 20, but it would be deactivated. Referring to FIG. 7, the user-selectable region 18 for the logo 26 has been deactivated because the logo 26 has disappeared from the media stream 14. When the object 12 reappears in the media stream 14, the user-selectable region 18 would be re-created or reactivated. The re-defining of the user-selectable region 18 may be accomplished either through manual manipulation of the user-selectable regions 18 or through automatic detection of the objects 12.

In order to automatically define and re-define the user-selectable regions 18, the editor 22 may also include a detector (not shown). The detector may be integrally formed with the editor 22 as an additional component of the software. The detector monitors and detects an identifying characteristic for the object 12 with the layer 20. As described above, the position and/or the size of the object 12 may change throughout the media stream 14. The detector detects the movement of the object 12 within the media stream 14 and re-defines the user-selectable region 18 as necessary and without outside involvement. The movement may be detected based upon a change in an identifying characteristic and re-defining the user-selectable region 18 within the layer 20 in response to detecting the change of the identifying characteristic. A most preferred method would be to automatically detect the change and automatically re-define the user-selectable region 18 within the layer 20 in response to automatically detecting the change. One of way detecting movement or changes in the object 12 would be to monitor a color palette or a predetermined symbol.

For example, if the network logo 26 is present in the media stream 14, the detector might look for that logo 26 and define the user-selectable region 18 accordingly. If the logo 26 disappears from the screen, the user-selectable region 18 may disappear or become disabled. If an icon 36 for the logo 26 was present in the layer 20, it may also disappear in response to the logo 26 disappearing from the media stream 14 or it may become darkened as is common to indicate deactivation. Further, the detector may watch for the particular color palette and re-define the user-selectable region 18 in response to it changing. This would be particularly useful for sporting events, where each team has their own jersey being a particular color of the color palette.

Referring back to FIG. 3, after the user-selectable regions 18 have been defined, a link 34 is associated between the user-selectable region 18 and the information 10 associated with the object 12. The link 34 is established in the editor 22 by selecting the user-selectable region 18 and inputting a location for the information 10. The link 34 is the location where the information 10 associated with the object 12 is stored. The link 34 may be an IP address, a file location, and the like. The link 34 is linked with the user-selectable region 18 such that when the user selects the user-selectable regions 18, the link 34 is accessed and the information 10 is then displayed. Once the link 34 and the user-selectable regions 18 are associated, a file is created and stored containing the links and the positional data, mapping data, or time, for the user-selectable regions 18. The file is executed in the layer 20 during the playback of the media stream 14 in the player to display the user-selectable regions 18, as will be further described below.

It is to be appreciated by those skilled in the art that the media stream 14 is played or advanced in the editor 22 while the defining and re-defining of the user-selectable region 18 is on going in the layer 20. The play back of the media stream 14 is significantly different than accessing individual frames of the media stream 14. Playing the media stream 14 is based on time and not individual frames. It requires significant time, effort, and skill to edit individual frames of the media stream 14 and would make defining and re-defining user-selectable regions 18 nearly impractical. When editing individual frames, the resultant file having the edited frames requires large amounts of storage because of the large volume of information 10 required for each of the frames. As set forth above, editing a half-hour media stream 14 would require editing 108,000 individual frames.

Further, even to edit selected individual frames of the media stream 14, such as every $3^{rd}$ or $5^{th}$ frame, would take considerable time and effort. If only every $5^{th}$ frame is edited, it would require editing 21,600 frames. The file containing the data associated with this large number of frames is costly to store, transmit, and reproduce. The subject invention does not require editing individual frames and instead is based upon the length and time of the media stream 14. Additionally, since the user-selectable regions 18 can be defined by advancing the media stream 14 at a faster play back rate than a normal playback rate, a half-hour media stream 14 may take much less than half an hour to define the user-selectable regions 18 therein. The file containing the links and user-selectable regions 18 is smaller, which significantly reduces the time and effort required, as well as the cost to store, transmit, and reproduce the data.

The user-selectable regions 18 may be present in the layer 20 for the entire length of the media stream 14, subject to the object 12 being present therein. Said another way, the user-selectable regions 18 aren't present for one frame and gone the next frame, so long as the object 12 remains in the media stream 14. Since the subject invention does not edit individual frames of the media stream 14, the user-selectable regions 18 are continuously present when the objects 12 are present. This is distinguishable from the prior methods that edit individual frames of the media stream 14 and input the user-selectable regions 18 every few frames to save time and bandwidth.

When the user-selectable region 18 is present in the layer 20, an icon 36 may be disposed in the layer 20 to indicate to the user that user-selectable regions 18 are available to be selected. The user may use any controls to select either one of the icons 36 or the user-selectable regions 18. For example, but in no way limiting, the user may use a remote control 38 (see FIG. 8) as an input device to move between user-selectable regions 18 and select it by pressing a particular key. The indicator for the user-selectable regions 18 may also be incorporated directly into the remote control 38. In another example, the user may navigate by a mouse (not shown), either wired or wireless. The mouse and/or the remote control 38 may operate by infrared, radio frequency or the like. Alternatively, if the user-selectable region 18 is within the layer 20, the icon 36 may automatically be highlighted, so the user only has to press the particular key to access the information 10. Additional indicators other than as described may be present to inform the user that the user-selectable regions 18 are enabled and that they may access the information 10 associated with the object 12.

In operation, the layer 20 is disposed adjacent the media stream 14 without interfering with playback of the media stream 14 in the player, as illustrated in FIGS. 5-8. Since the layer 20 is preferably a clear applet, it can overlay the player and the media stream 14 without interfering with playback. The file containing the user-selectable regions 18 and links is retrieved within the layer 20 and queued to the starting point associated with the media stream 14. The media stream 14 is then played in the player and the user-selectable regions 18 are positioned within the layer 20 and correspond to the object 12 as described above. The user may then select the user-selectable region 18 from within the layer 20 during playback of the media stream 14 by either selecting the region 18 or the icon 36, if present. The information 10 that is associated with the object 12 is accessed in response to selecting the user-selectable region 18 from within the layer 20. As shown in FIG. 5, selecting the icon 36 of the suit 32 displays the information 10 for the suit. Likewise, in FIG. 6, the user-selectable region 18 for the flag 28 is selected and the information 10 is displayed for the flag 28.

Various methods may be used to retrieve the file for displaying in the layer 20. One such method, but not limited to, utilizes meta data available in the media stream 14. The meta data is essentially open space present in the media stream 14 that can store tasks to be performed, trigger other functions, or take actions prior to playing the media stream 14. The meta data is typically located at the very beginning of the media stream 14. One action that may be triggered by the meta data is to obtain the file containing the user-selectable regions 18. The subject invention would reference the location of the file in the meta data. In this manner, the media stream 14 would be read by the player, the file containing information 10 for the user-selectable regions 18 is retrieved, and the information 10 loaded into the player. The file is capable of being stored in various locations so long as it is accessible by the device playing the media stream 14. This may include servers provided by the provider of the media stream 14 or separate from the provider, such as the provider of the layer 20. It is to be appreciated that those skilled in the art may devise alternate methods of retrieving the file than as described above, such as transmitting the file directly with the media stream 14.

Once the user-selectable region 18 is selected, the media stream 14 may be stopped and the information 10 may then be displayed or the media stream 14 may continue to play while the information 10 is displayed. In either scenario, the information 10 may be displayed in any one of the layer 20, the player, and a window separate from the layer 20 and the player, such as transmitting the file directly with the media stream 14.

Figure 9:
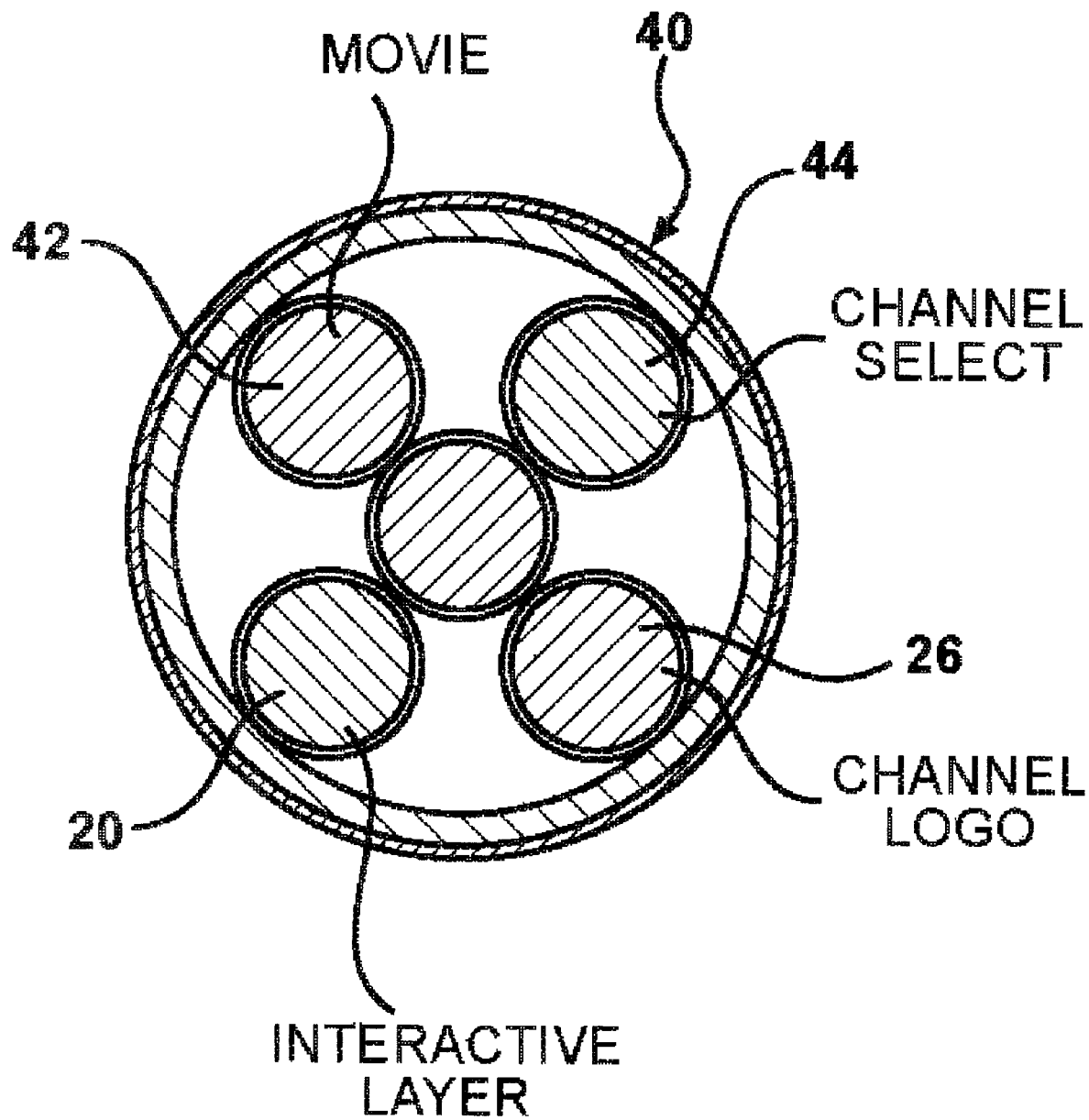
FIG. 9 is an illustration of a video signal having the media stream and the layer with the user-selectable region transmitted therewith.

One advantage of the subject invention is that it allows for two-way communication to be established between the user interacting with the layer 20 and a provider transmitting a video signal 40 having the media stream 14 and the layer 20. Referring to FIG. 9, the video signal 40 is illustrated as including the media stream 14 as a movie 42, a channel logo 26 to be imposed over the movie 42, a channel guide feature 44, and the layer 20. The provider can then detect how often the objects 12 are selected and this in turn would allow them to adjust the cost of advertising within the media stream 14. Further, the collection of the user data may be retained for future interaction and may even allow the provider to tailor the user-selectable regions 18 to the individual user based upon past selections. The user-selectable regions 18 that are selected may also be tracked and transmitted to either the provider or the producer of the object 12 for instantaneous feedback of the marketing and advertising.

Another advantage of the subject invention is that is may be incorporated into existing systems without any additional hardware and minimal, if any, additional software. Currently, providers supply the video signal 40 to the user and the video signal 40 includes a first component having the media stream 14 therein. The subject invention would therefore include transmitting a second component with the video signal 40 having the layer 20 with the user-selectable regions 18 corresponding to objects 12 present in the media stream 14 and linked to information 10 associated with the object 12. As described above, the media stream 14 may include the location of the file to be displayed in the layer 20. Often, as is the case with digital cable, other components may be transmitted as a part of the video signal 40. The other components may include such features as video on demand, television channel guides, and the like. The existing equipment would receive both the first and the second component of the video signal 40. The player would play the media stream 14 and the layer 20 would be disposed adjacent the player. The user may even be unaware that the layer 20 is disposed adjacent the media stream 14, since it does not interfere with the playback. Once the media stream 14 is played, the user has the ability to interact with the layer 20 and access the object information 10.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

The invention claimed is:

1. A method of retrieving information (10) associated with an object (12) present in a media stream (14), said method comprising the steps of:
    defining a user-selectable region (18) in a layer (20) separate from the media stream (14) and without accessing individual frames of the media stream (14), the user-selectable region (18) tracking a position of the object (12) present in the media stream (14);
    defining a link (34) to the information (10) associated with the object (12);
    linking the user-selectable region (18) in the layer (20) to the link (34) for the information (10) associated with the object (12);
    positioning the user-selectable region (18) in the layer (20) over the object (12) such that the user-selectable region (18) tracks the position of the object (12) during playback of the media stream (14);
    disposing the layer (20) adjacent the media stream (14) without interfering with playback of the media stream (14);
    playing the media stream (14) in a player;
    selecting the user-selectable region (18) from within the layer (20) during playback of the media stream (14); and
    accessing the information (10) associated with the object (12) in response to selecting the user-selectable region (18) from within the layer (20).

2. A method as set forth in claim 1 wherein the step of defining the user-selectable region (18) is further defined as the step of defining positional data for the object (12) based upon a position and size of the object (12) present in the media stream (14).

3. A method as set forth in claim 1 further including the step of re-defining the user-selectable region (18) within the layer (20) in response to the object (12) changing within the media stream (14).

4. A method as set forth in claim 1 wherein the step of defining the user-selectable region (18) further includes the step of defining a plurality of user-selectable regions (18) for the object (12) in response to the object (12) being present in a plurality of positions in the media stream (14).

5. A method as set forth in claim 1 wherein the step of positioning the user-selectable region (18) is further defined as synchronizing the user-selectable region (18) within the layer (20) to a position of the object (12) in the media stream (14) without accessing individual frames of the media stream (14).

6. A method as set forth in claim 1 further including the step of displaying an icon (36) within the layer (20) representing the user-selectable region (18) present in the layer (20) capable of being selected.

7. A method as set forth in claim 1 further including the step of monitoring an identifying characteristic for the object (12) in the media stream (14).

8. A method as set forth in claim 7 wherein the step of monitoring the identifying characteristic is further defined as monitoring the media stream (14) for a predetermined color palette.

9. A method as set forth in claim 7 wherein the step of monitoring the identifying characteristic is further defined as monitoring the media stream (14) for a predetermined symbol.

10. A method as set forth in claim 7 further including the step of detecting a change in the identifying characteristic and re-defining the user-selectable region (18) within the layer (20) in response to detecting the change of the identifying characteristic.

11. A method as set forth in claim 10 wherein the step of detecting the change in the identifying characteristic is further defined as automatically detecting the change in the identifying characteristic for the object (12) during playback of the media stream (14).

12. A method as set forth in claim 11 wherein the step of re-defining the user-selectable region (18) is further defined as automatically re-defining the user-selectable region (18)

within the layer (20) in response to automatically detecting the change in the identifying characteristic for the object (12).

13. A method as set forth in claim 1 further including the step of stopping playback of the media stream (14) in response to selecting the user-selectable region (18) from within the layer (20).

14. A method as set forth in claim 13 further including the step of displaying the object information (10) in at least one of the layer (20), the player, and a window separate from the layer (20) and the player, while the playback of the media stream (14) is stopped.

15. A method as set forth in claim 1 further including the step of continuing playback of the media stream (14) in response to selecting the user-selectable region (18) from within the layer (20).

16. A method as set forth in claim 15 further including the step of displaying the object information (10) in at least one of the layer (20) and a window separate from the layer (20) while the playback of the media stream (14) continues in the player.

17. A method as set forth in claim 1 further including the step of establishing two-way Communications between a user interacting with the layer (20) and a provider transmitting a video signal (40) having the media stream (14) and the layer (20).

18. A method as set forth in claim 17 further including the step of collecting user data related to selection of links made during playback of the media stream (14) present therein.

19. A method as set forth in claim 18 further including the step of transmitting the user data to the provider to track the links selected from within the layer (20).

20. A method of providing a video signal (40) from a provider to a user, said method comprising the steps of:
    transmitting a first component of the video signal (40) having a media stream (14) therein;
    transmitting a second component of the video signal (40) having a layer (20) with user-selectable regions (18) tracking a position of objects (12) present in the media stream (14) and linked to information (10) associated with the object (12);
    receiving the video signal (40) with a player;
    disposing the layer (20) adjacent the media stream (14) without interfering with playback of the media stream (14);
    playing the media stream (14) in the player;
    synchronizing the user-selectable region (18) within the layer (20) to a position of the object (12) in the media stream (14) without accessing individual frames of the media stream (14); and
    enabling the user-selectable region (18) to allow the user to select the user-selectable regions (18) and access the information (10) associated with the object (12).

21. A method as set forth in claim 20 further including the step of establishing two-way Communications between the user interacting with the layer (20) and the provider transmitting the video signal (40).

22. A method as set forth in claim 21 further including the step of collecting user data related to selection of links made during playback of the media stream (14).

23. A method as set forth in claim 22 further including the step of transmitting the user data to the provider to track the links selected from within the layer (20).

24. A device for storing information (10) associated with an object (12) present in a media stream (14), said device comprising:
    a media stream (14) with an object (12) therein;
    information (10) associated with said object (12);
    a layer (20) for disposition adjacent said media stream (14) during playback and having a user-selectable region (18) tracking a position of said object (12) in said media stream (14) to synchronize said user-selectable region (18) within said layer (20) to the position of the object (12) in the media stream (14) without accessing individual frames of the media stream (14) during playback; and
    a link (34) between said user-selectable region (18) and said information (10) associated with said object (12) for accessing said information (10) associated with said object (12) in response to said user-selectable region (18) being selected.

25. A device as set forth in claim 24 further including positional information defined for said user-selectable region (18) based upon a position and size of said object (12) present in said media stream (14).

26. A device as set forth in claim 25 further including a plurality of user-selectable regions (18) in said layer (20) corresponding to a plurality of objects (12).

27. A device as set forth in claim 24 further including an icon (36) disposed in said layer (20) in response to said user-selectable region (18) being present in said layer (20).

28. A device as set forth in claim 24 further including a detector for monitoring and detecting an identifying characteristic for the object (12) with said layer (20).

29. A device as set forth in claim 28 wherein said detector is further defined as detecting a color palette.

30. A device as set forth in claim 28 wherein said detector is further defined as detecting a predetermined symbol.

31. A device as set forth in claim 24 further including a window for displaying information (10) associated with the object (12).

32. A device as set forth in claim 31 wherein said window is further defined as being displayed in said layer (20).

33. A device as set forth in claim 31 wherein said window is further defined as being displayed in said media stream (14).

34. A device as set forth in claim 31 wherein said window is further defined as a window separate from said layer (20) and said media stream (14).

35. A system capable of storing and retrieving information (10) associated with an object (12) present in a media stream (14) provided with a video signal (40) from a provider, said system comprising:
    an editor (22) defining a user-selectable region (18) tracking a position of the object (12) in the media stream (14) without accessing individual frames of the media stream (14) and defining a link (34) between said user-selectable region (18) and information (10) associated with said object (12);
    a player device (16) for playing the media stream (14) with the object (12) therein; and
    a layer (20) disposed adjacent the media stream (14) during playback and presenting the user-selectable region (18) for selection by the user to access the information (10) such that said user-selectable region (18) is synchronized within said layer (20) to the position of the object (12) in the media stream (14) without accessing individual frames of the media stream (14).

36. A system as set forth in claim 35 wherein the layer (20) is further defined as being transmitted as a component of the video signal (40).

37. A system as set forth in claim 35 wherein the layer (20) disposed adjacent the media stream (14) is further defined as being disposed adjacent the media stream (14) without interfering with playback of the media stream (14).

38. A system as set forth in claim 35 further including a plurality of user-selectable regions (18) in said layer (20) corresponding to a plurality of objects (12).

39. A system as set forth in claim 35 further including an icon (36) disposed in said layer (20) in response to said user-selectable region (18) being present in said layer (20).

* * * * *